United States Patent [19]
Bracken et al.

[11] Patent Number: 6,085,455
[45] Date of Patent: Jul. 11, 2000

[54] PROTECTIVE HOUSING FOR A FISHING POLE

[75] Inventors: Thomas Lee Bracken; Ruth Ann Bracken, both of Terre Haute, Ind.

[73] Assignee: B&G Manufacturing Enterprises, LLC, Terre Haute, Ind.

[21] Appl. No.: 09/200,191

[22] Filed: Nov. 25, 1998

[51] Int. Cl.[7] .......................... A01K 87/00; A01K 97/08; B65D 85/00
[52] U.S. Cl. ................... 43/25.2; 43/25; 43/26; 206/315.11
[58] Field of Search ............... 43/25, 25.2, 26, 43/54.1; D22/139, 149; 206/315.11, 443; 220/4.22, 4.24

[56] References Cited

U.S. PATENT DOCUMENTS

| | | | |
|---|---|---|---|
| D. 360,015 | 7/1995 | Cosby et al. | D22/139 |
| D. 405,499 | 2/1999 | Beauvais | D22/139 |
| 2,523,361 | 9/1950 | Farnham | 43/25.2 |
| 2,591,674 | 4/1952 | Chalker | 220/324 |
| 2,767,502 | 10/1956 | Reynolds | 43/25.2 |
| 3,086,312 | 4/1963 | Davis | 43/25.2 |
| 3,972,144 | 8/1976 | Geisler | 43/26 |
| 3,987,574 | 10/1976 | Pennino | 43/26 |
| 4,216,604 | 8/1980 | Starke | 43/25.2 |
| 4,418,490 | 12/1983 | Ancona | 43/25.2 |
| 4,441,274 | 4/1984 | Masur | 43/25.2 |
| 4,452,003 | 6/1984 | Deutsch et al. | 43/25.2 |
| 4,530,178 | 7/1985 | Rauscher | 43/26 |
| 4,546,877 | 10/1985 | Evans | 206/315.11 |
| 4,771,564 | 9/1988 | Whitley | 43/4 |
| 4,916,852 | 4/1990 | Zebleckis | 43/26 |
| 4,920,683 | 5/1990 | Weber | 43/25.2 |
| 4,944,111 | 7/1990 | Daniel | 43/25.2 |
| 4,946,034 | 8/1990 | Matsubara | 206/315.11 |
| 4,974,537 | 12/1990 | Martin | 114/255 |
| 5,199,208 | 4/1993 | Matchette | 43/25.2 |
| 5,235,775 | 8/1993 | Daughtry | 43/25.2 |
| 5,446,990 | 9/1995 | Eriksson | 43/25.2 |
| 5,475,942 | 12/1995 | Tatum | 43/25.2 |
| 5,502,916 | 4/1996 | Krewson, Jr. | 43/25.2 |
| 5,505,014 | 4/1996 | Paullin | 43/25.2 |
| 5,515,640 | 5/1996 | Cosby et al. | 43/25.2 |
| 5,575,104 | 11/1996 | Wilding | 43/25.2 |
| 5,588,245 | 12/1996 | Vance | 43/25.2 |

FOREIGN PATENT DOCUMENTS

| | | | |
|---|---|---|---|
| 732817 | 4/1966 | Canada | 43/25.2 |
| 144620 | 3/1954 | Sweden | 43/25.2 |
| WO 92/10931 | 7/1992 | WIPO | 43/25.2 |

*Primary Examiner*—Michael J. Carone
*Assistant Examiner*—Fredrick T. French, III
*Attorney, Agent, or Firm*—Salter Michaelson

[57] ABSTRACT

A protective housing for a fishing pole is disclosed. The protective housing includes first and second housing elements, each having a substantially planar surface, first and second opposing longitudinal walls and first and second opposing end walls extending from the substantially planar surface, the first longitudinal walls of the first and second housing elements being hingedly coupled together so as to form an interior chamber when the protective housing is in a closed position. In the closed position, the second longitudinal wall and the first and second end wall of the first housing element are in mutual contact with the second longitudinal wall and the first and second end wall of the second housing element, respectively. The second longitudinal walls of each of the first and second housing elements have cooperating latch elements for securing the protective housing in the closed position and the first and second end walls of each of the first and second housing elements have a semicircular cutout arranged so as to form a circular opening in each end of the protective housing when in the closed position. The protective housing is mountable on the fishing pole by placing the rod longitudinally across one of the first and second housing elements, within the cutouts in the end walls of the housing element, and pivoting the first and second housing elements together until the protective housing is in the closed position with the rod being disposed within the circular openings at each end of the protective housing. The protective housing further includes at least one storage compartment integrally formed with the first housing element, the storage compartment being constructed and arranged so as to be located within the interior chamber when the protective housing is in the closed position.

11 Claims, 6 Drawing Sheets

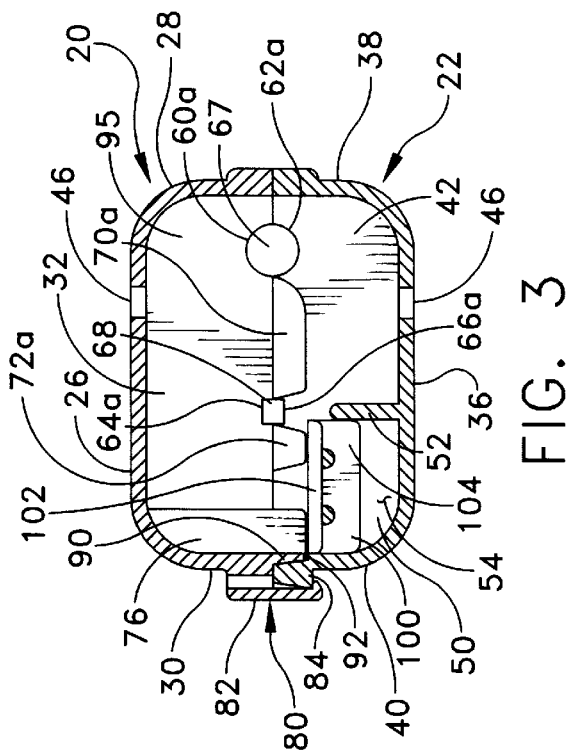
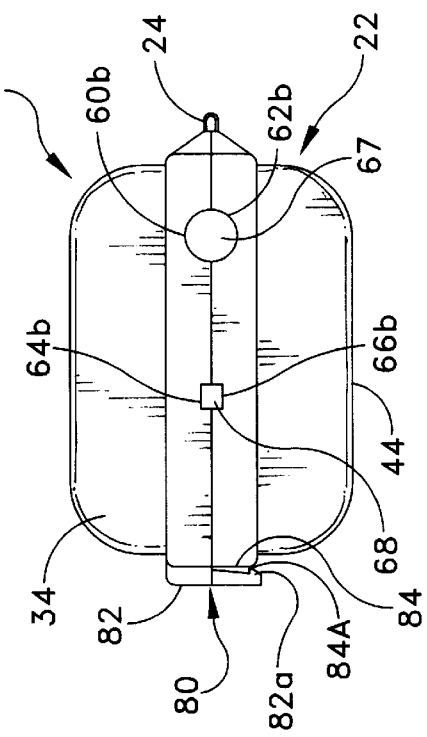
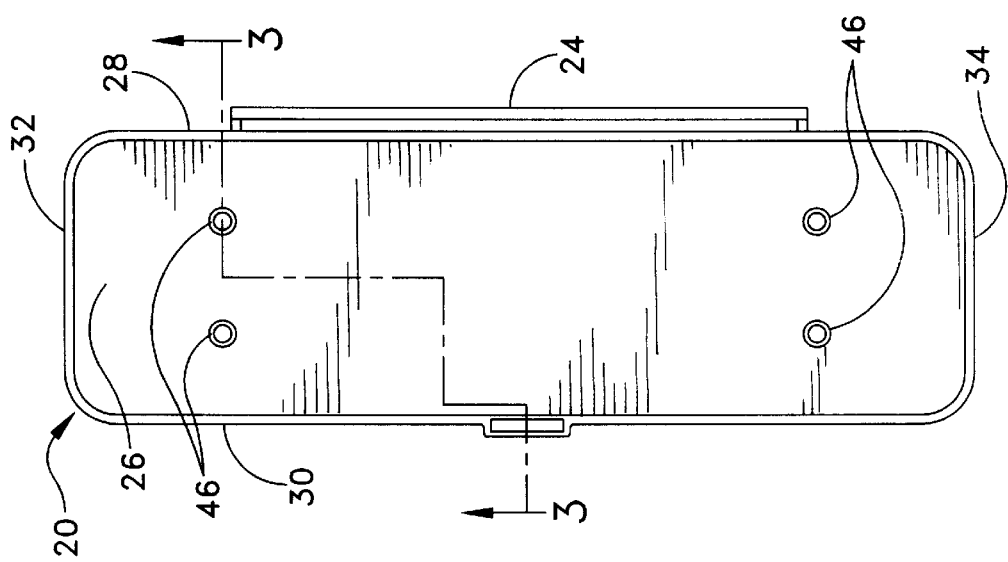

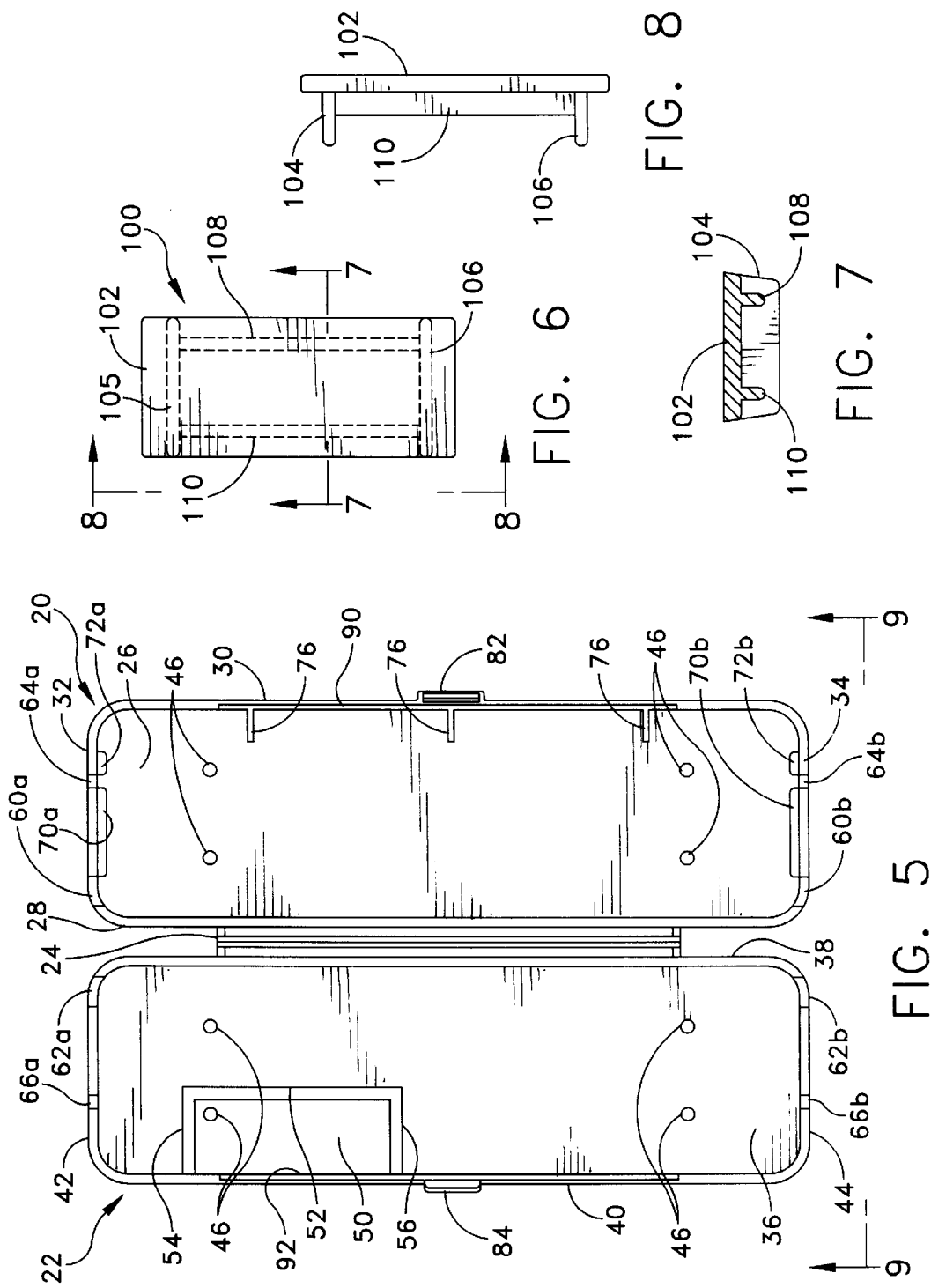

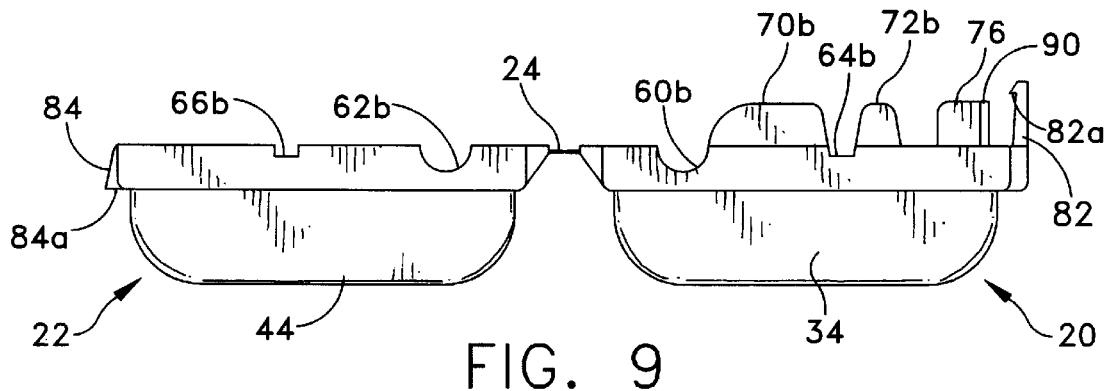
FIG. 9
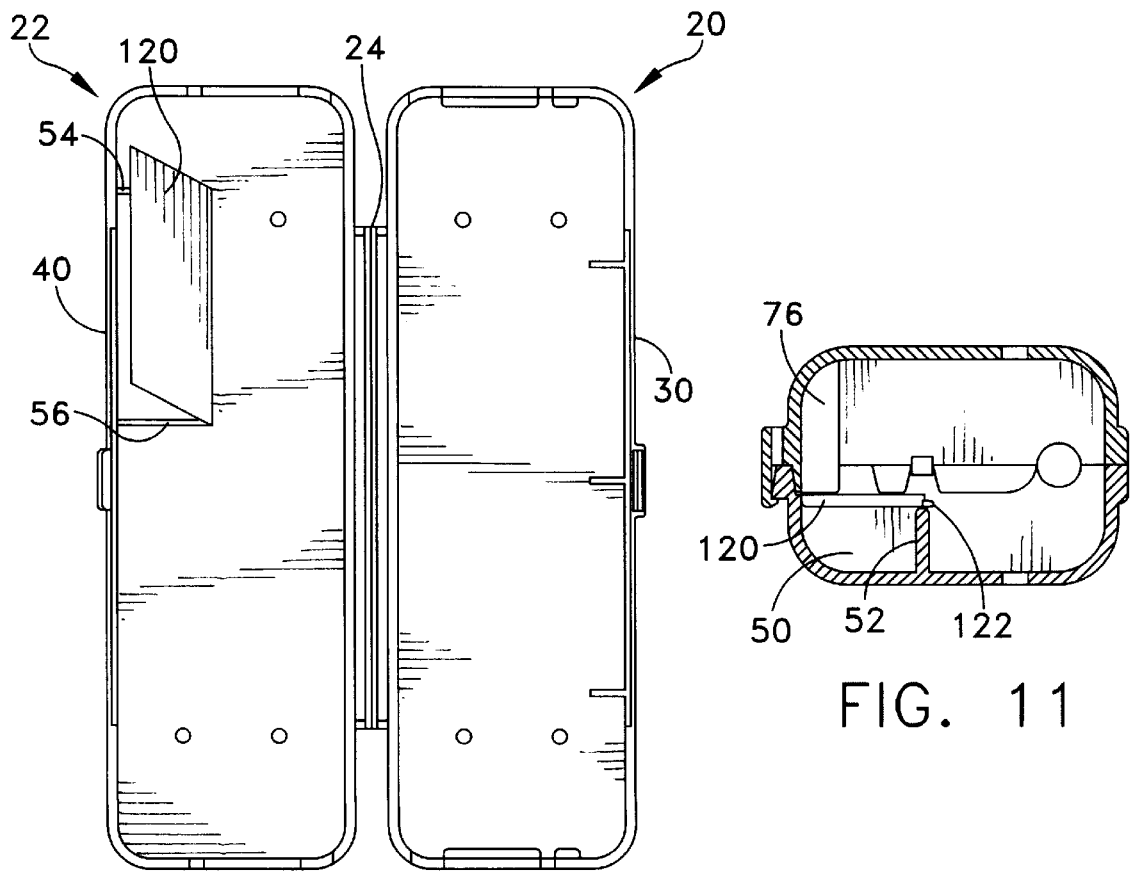
FIG. 10
FIG. 11

PROTECTIVE HOUSING FOR A FISHING POLE

BACKGROUND OF THE INVENTION

1. Field of the Invention

The present invention relates generally to a protective housing for a fishing pole, and more specifically to a protective housing for preventing fishing hooks or lures attached to the fishing pole from becoming entangled with other fishing poles and from being snagged on clothing or upholstery, the protective housing including a storage compartment for allowing the storage of fishing tackle within the protective housing.

2. Discussion of the Related Art

Typically, when transporting fishing poles, the fishing hook or hooked lure that is attached to the fishing line of the pole is hooked onto one of the eyelets of the fishing pole and the slack is taken out of the fishing line in order to secure the hook to the eyelet. This allows the fishing pole to be transported without having the hook swinging freely from the end of the fishing pole. However, even though, in this configuration, the hook is prevented from freely swinging from the end of the fishing pole, it is still exposed and can become entangled in adjacent fishing pole lines, snagged on clothing or upholstery and cause injuries to nearby people.

There are several devices which are used to cover the hook to prevent damage or injury which can be caused by an exposed fishing hook. U.S. Pat. No. 2,767,502 to Reynolds discloses a case in which a fishing lure is placed inside the case, the pole is secured to the case and the case is closed to enclose the lure. U.S. Pat. No. 4,216,604 to Starke discloses a fishing rod tip guard which is placed over the tip of a fishing pole to protect the tip and to cover the hook attached to the line of the fishing pole. Likewise, U.S. Pat. Nos. 4,441,274; 4,452,003; 4,920,683; 5,235,775 and 5,588,245 disclose various fishing pole cases for covering a hook which is attached to the fishing pole.

While the above inventions provide cases for enclosing fishing hooks during transport of the fishing poles, they do not provide adequate storage within the cases for items such as extra hooks, lures, line weights and the like. While, in the prior art cases, these items may be placed within the case before it is closed, the items are loose within the case and can both fall out of the case when it is opened and become entangled with the hooks and line of the fishing pole to which the case is attached.

What is needed is a protective housing for a fishing pole which is capable of enclosing a hook which is attached to the line of the fishing pole while providing a secure storage compartment separate from the compartment which houses the hook and line attached to the fishing pole.

SUMMARY OF THE INVENTION

The present invention provides a protective housing for a fishing pole which both encloses a hook which is attached to a line of the fishing pole to prevent the hook from entangling with other fishing pole lines, becoming snagged in clothing or upholstery and causing injuries, which also provides a separate and secure storage compartment for storing fishing tackle.

According to one embodiment of the invention, a protective housing for a fishing pole is disclosed. The protective housing includes first and second housing elements, each having a substantially planar surface, first and second opposing longitudinal walls and first and second opposing end walls extending from the substantially planar surface, the first longitudinal walls of the first and second housing elements being hingedly coupled together so as to form an interior chamber when the protective housing is in a closed position. In the closed position, the second longitudinal wall and the first and second end wall of the first housing element are in mutual contact with the second longitudinal wall and the first and second end wall of the second housing element, respectively. The second longitudinal walls of each of the first and second housing elements have cooperating latch elements for securing the protective housing in the closed position and the first and second end walls of each of the first and second housing elements have a semicircular cutout arranged so as to form a circular opening in each end of the protective housing when in the closed position. The protective housing is mountable on the fishing pole by placing the rod longitudinally across one of the first and second housing elements, within the cutouts in the end walls of the housing element, and pivoting the first and second housing elements together until the protective housing is in the closed position with the rod being disposed within the circular openings at each end of the protective housing. The protective housing further includes at least one storage compartment integrally formed with the first housing element, the storage compartment being constructed and arranged so as to be located within the interior chamber when the protective housing is in the closed position.

The storage compartment has a first wall disposed substantially parallel to the second longitudinal wall of the first housing element and first and second opposing side walls which interconnect the first wall with the second longitudinal wall, the first wall, second longitudinal wall and first and second side walls defining an interior region of the storage compartment. The protective housing also includes a cover constructed and arranged to be friction fit onto the storage compartment. The cover includes a substantially planar element having dimensions substantially similar to dimensions of the storage compartment, the planar element including first and second ribs constructed and arranged on the planar element such that when the cover is mounted on the storage compartment, the first rib frictionally engages the first side wall of the storage compartment and the second rib frictionally engages the second side wall of the storage compartment.

BRIEF DESCRIPTION OF THE DRAWINGS

The invention will now be described in greater detail with reference to the accompanying drawings, in which:

FIG. 2 is a top view of the protective housing of the present invention in the closed position;

FIG. 3 is a cross-sectional view of the protective housing of the present invention in the closed position, taken along line 3—3 of FIG. 2;

FIG. 4 is an end view of the protective housing of the present invention in the closed position;

FIG. 5 is a top view of the protective housing of the present invention in the open position;

FIG. 6 is a top view of the storage compartment cover of the protective housing of the present invention;

FIG. 7 is a cross-sectional view of the storage compartment cover of the protective housing of the present invention, taken along line 7—7 of FIG. 6;

FIG. 8 is a side view of the storage compartment cover of the protective housing of the present invention, taken along line 8—8 of FIG. 6;

FIG. 9 is an end view of the protective housing of the present invention in the open position;

FIG. 10 is a top view of the protective housing of a second embodiment of the present invention in the open position;

FIG. 11 is a cross-sectional view of the protective housing of the second embodiment of present invention, taken along line 3—3 of FIG. 2;

DETAILED DESCRIPTION

Figure 1:
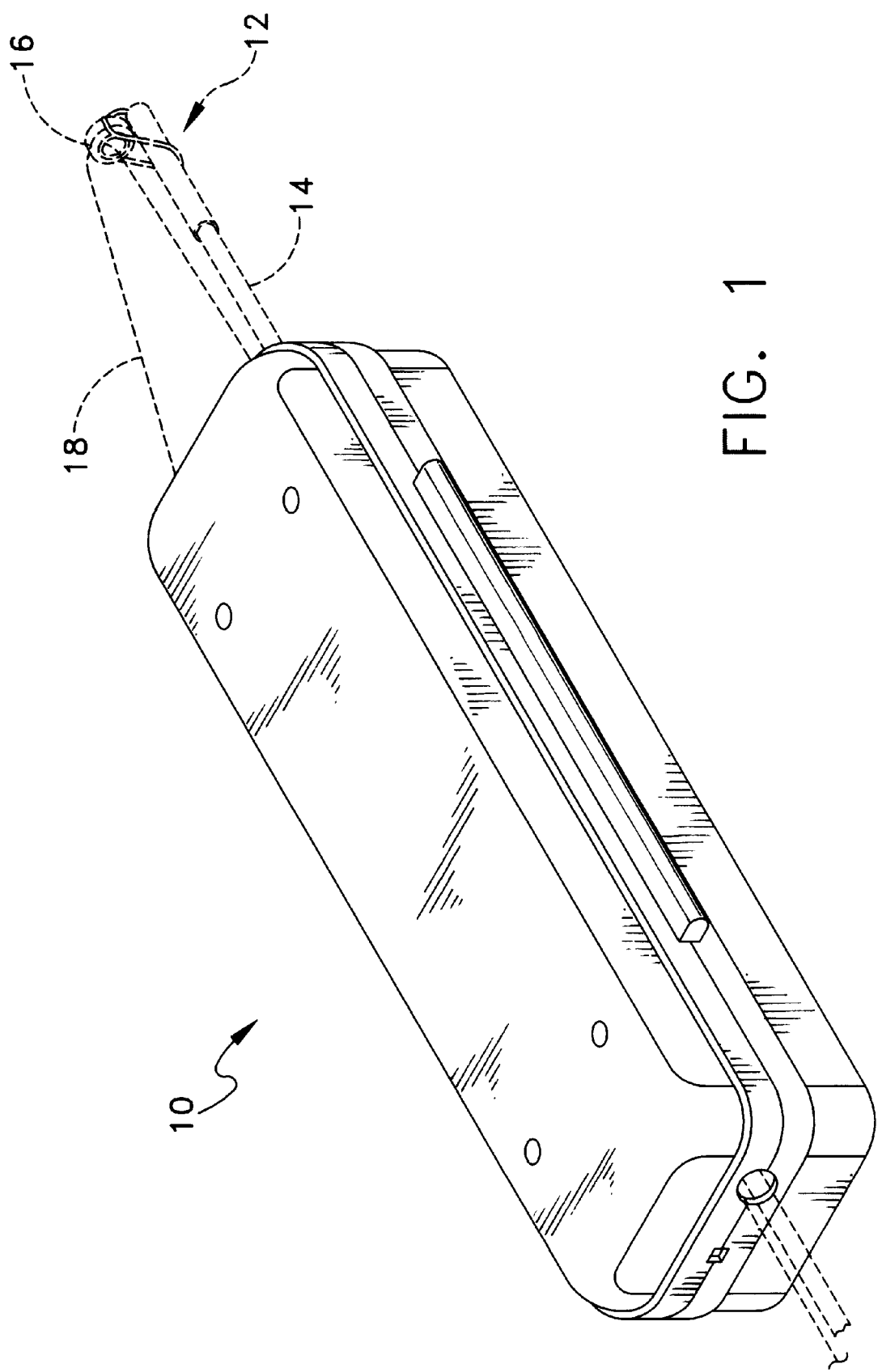
FIG. 1 is a perspective view of the protective housing of the present invention, shown installed on a fishing pole.

Referring now to the drawings, the protective housing of the present invention will be described. Shown in FIG. 1 is the protective housing 10 shown installed on a fishing pole 12 which includes a rod 14, a number of eyelets 16 (only one being shown in FIG. 1) and a fishing line 18. The fishing line 18 is supplied from a reel (not shown), is threaded through the eyelets 16 and has a hook (not shown) tied to one end. It will be understood that any type of lure may be attached to the fishing line and still be used with the present invention, however, for simplicity, a simple hook is shown in the drawings for use with the present invention.

Referring now to FIGS. 2–9 a first embodiment of the present invention will be described. The protective housing 10 includes a first housing element 20 and a second housing element 22. First housing element 20 and second housing element 22 are coupled together by a hinge 24, which preferably is formed as a living hinge. In the preferred embodiment, the first housing element 20, second housing element 22 and hinge 24 are formed as one piece using a two cavity injection mold into which a plastic material such as polypropelene is injected.

First housing element 20 includes a planar surface 26, opposing longitudinal walls 28 and 30 which depend downwardly (as shown in FIG. 3) from the long sides of planar surface 26 and opposing end walls 32 and 34 depending downwardly from the short sides of planar surface 26. Likewise, second housing element 22 includes a planar surface 36, opposing longitudinal walls 38 and 40 which depend downwardly (as shown in FIG. 3) from the long sides of planar surface 36 and opposing end walls 42 and 44 depending downwardly from the short sides of planar surface 36. Planar surfaces 26 and 36 include a number of apertures 46, which provide ventilation and drainage for the protective housing. When in the closed position housing element 20 and housing element 22 cooperate to form an interior chamber 95 within which, as described in detail below, the fishing pole and fishing tackle may be stored.

Referring now to FIG. 3, which is a cross-sectional view of the protective housing 10, taken along line 3—3 in FIG. 2, FIG. 4, which is an end view of the protective housing 10 in a closed position, FIG. 5, which is a top view of the protective housing 10 in an open position and FIG. 9, which is an end view of the protective housing 10, as seen from line 9—9 in FIG. 5, further features of the invention will be described. End walls 32 and 34 of housing element 20 include semicircular cutouts 60a and 60b, respectively, which, when the protective housing is in the closed position, cooperate with semicircular cutouts 62a and 62b of side walls 42 and 44, respectively of housing element 22 to form the circular opening 67 in each end of the protective housing 10. As described in more detail below, these circular openings receive the fishing rod 14 when the protective housing 10 is installed on the fishing pole 12. Likewise, end walls 32 and 34 of housing element 20 include notches 64a and 64b, respectively, which, when the protective housing is in the closed position, cooperate with notches 66a and 66b of side walls 42 and 44, respectively of housing element 22 to form the opening 68 in each end of the protective housing 10. As described below, one or both of these openings receive the fishing line 18 when the housing 10 is installed.

End wall 32 of housing element 20 includes tabs 70a and 72a and end wall 34 of housing element 20 includes tabs 70b and 72b. These tabs 70a, 70b, 72a and 72b are interiorly offset with respect to the end walls 32 and 34, respectively, such that when the protective housing is in the closed position, tabs 70a and 72a of end wall 32 are disposed within and overlap end wall 42 and tabs 70b and 72b of end wall 34 are disposed within and overlap end wall 44. In the closed position, the tabs 70a and 72a act to strengthen the protective housing by holding the end walls 32 and 42 tightly together and the tabs 70b and 72b act to strengthen the protective housing by holding the end walls 34 and 44 tightly together.

The protective housing 10 is secured in the closed position by means of a latch 80. Latch 80 includes a hook portion 82 centrally located on longitudinal wall 30 of housing element 20 and a catch portion 84 centrally located on longitudinal wall 40 of housing element 22. Hook portion 82 includes a barb 82a which engages a ridge 84a of catch 84 in order to secure the protective housing 10 in the closed position, as shown in FIGS. 3 and 4. Longitudinal wall 30 of housing element 20 further includes a number of reinforcing ribs 76 which are interconnected by a lip 90 which runs along a length of the longitudinal wall 30, the ribs 76 being disposed perpendicularly to the longitudinal wall 30 and the lip 90. Longitudinal wall 40 of housing element 22 includes a groove 92 which has a length which is substantially the same as the length of lip 90. Ribs 76 and lip 90 extend beyond longitudinal wall 30 such that, when the protective housing 10 is in the closed position, ribs 76 extend from planar surface 26 into the housing element 22 and lip 90 extends into groove 92 and frictionally engages catch portion 84, as shown in FIG. 3. Ribs 76 and lip 90 act to add rigidity to the longitudinal wall 30 and thereby increasing the strength of the latch 80 and also of the protective housing 10.

Second housing element 22 includes a storage compartment 50 which is formed from a first wall 52 and opposing side walls 54 and 56. First wall 52 extends upwardly from planar surface 36 and is disposed parallel to longitudinal wall 40 of housing element 22 and side walls 54 and 56 extend upwardly from planar surface 36 and connect first wall 52 to longitudinal wall 40 such that the storage compartment 50 is defined by longitudinal wall 40, first wall 52 and side walls 54 and 56. A removable cover 100, which is separately molded from a polypropelene material, is used to secure items stored in the storage compartment 50.

Cover 100 includes a flat surface 102, having a length which is slightly longer than the length of the wall 52 of storage compartment 50 and a width which is substantially similar to the length of side walls 54 and 56 of storage compartment 50. Cover 100 also includes transverse ribs 104 and 106 and longitudinal ribs 108 and 110. Transverse ribs 104 and 106 extend across the width of cover 100 and have a distance between them which is substantially similar to the length of the wall 52 of storage compartment 50. This enables cover 100 to be frictionally secured to the storage compartment 50 since, when the cover 100 is installed on the storage compartment 50, transverse ribs 104 and 106 frictionally engage the interior surfaces of side walls 54 and 56, respectively, thereby holding cover 100 in place on storage compartment 50. Longitudinal ribs 108 and 110 extend between transverse ribs 104 and 106 and provide increased rigidity to the cover 100.

In the preferred embodiment, the protective housing 10 measures approximately seven inches in length and two inches in width and the storage compartment 50 measures approximately two inches in length and one inch in width. The length of the protective housing 10 enables the housing to be installed on a fishing pole over one of the eyelets of the fishing pole and between the eyelets above and below the eyelet which is inside the housing.

In another embodiment, shown in FIGS. 10 and 11, a cover 120 is attached to wall 52 of storage compartment 50 by a hinge 122, which is preferably a living hinge similar to the hinge 24. Cover 120 may include a friction latch similar to latch 80 to secure the cover 120 in a closed position or a rib 76 which extends from housing element 20 into housing element 22 may contact cover 120 when the protective housing is in the closed position, thereby holding cover 120 against side walls 54 and 56 and longitudinal wall 40.

Figure 12:
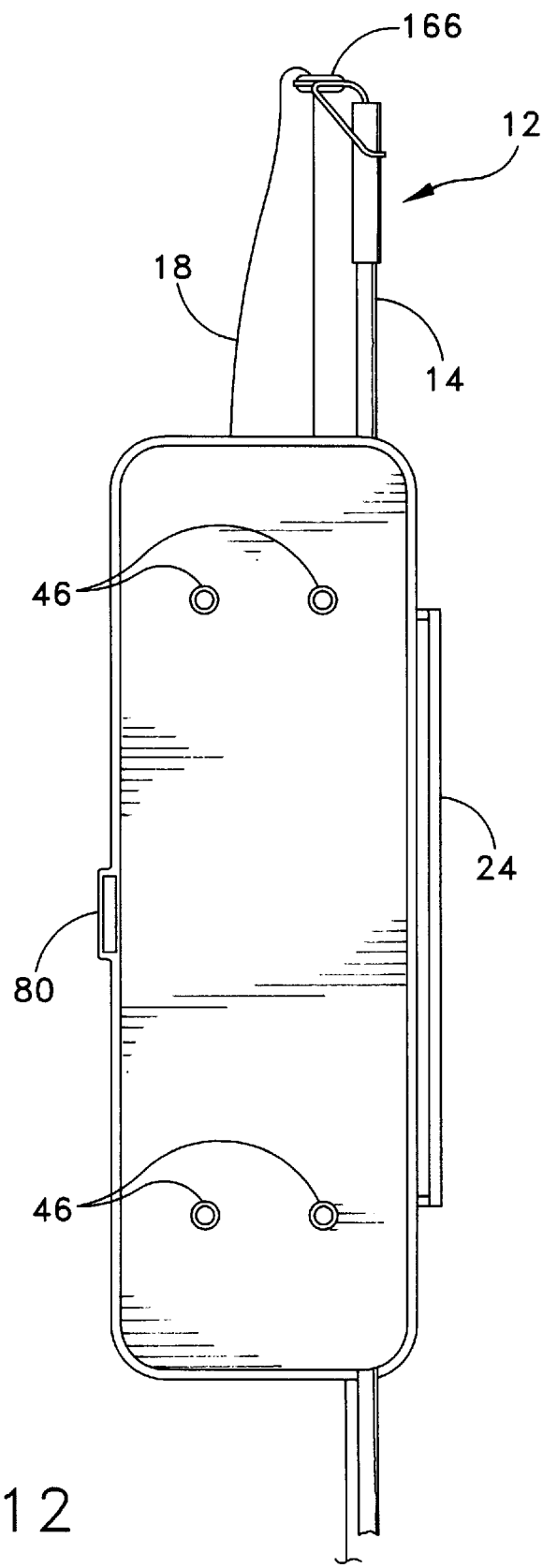
FIG. 12 is a top view of the protective housing of the present invention shown installed on a fishing pole and in the closed position.
Figure 13:
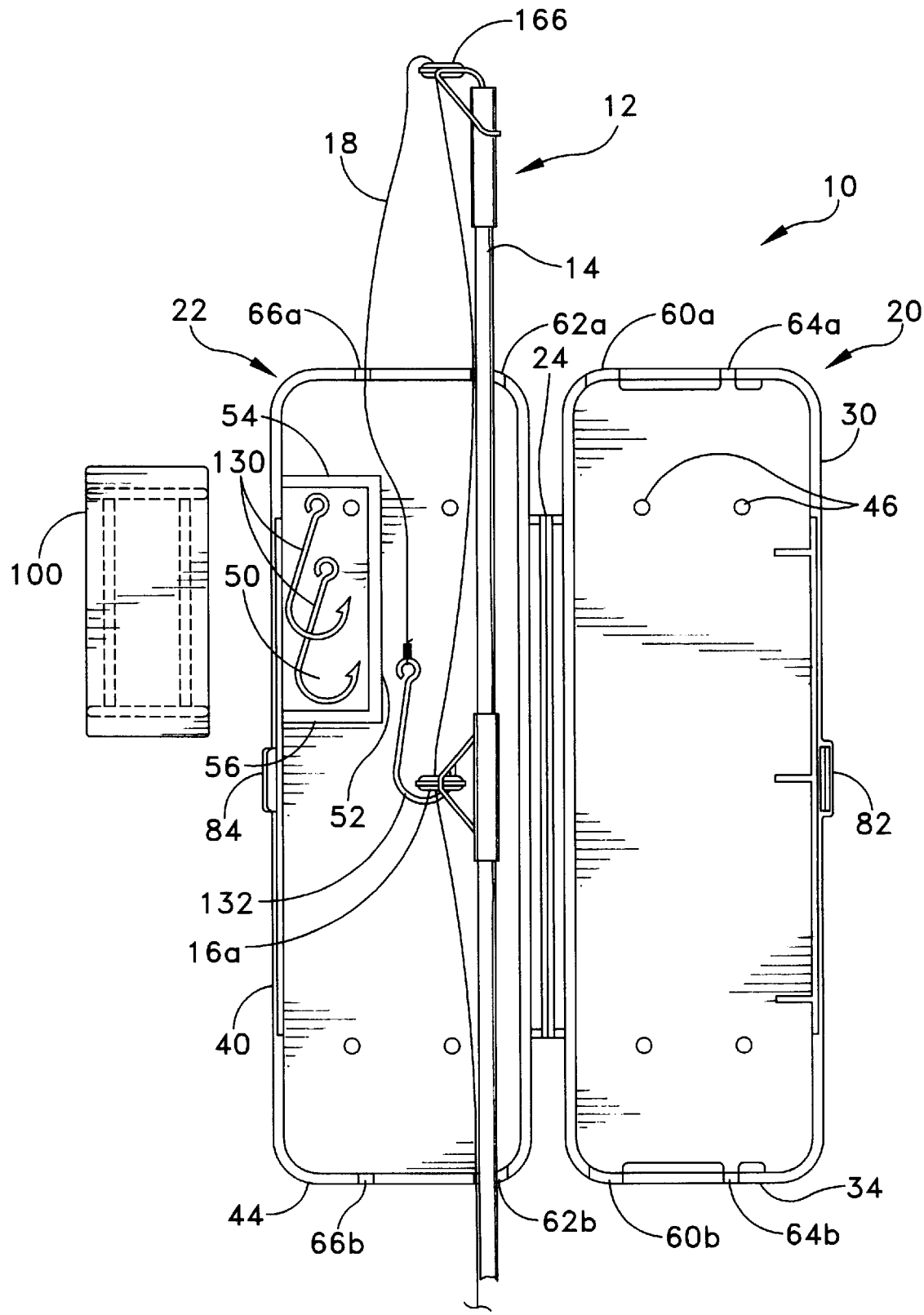
FIG. 13 is a top view of the protective housing of the present invention shown in the open position with a fishing pole placed in one of the housing elements of the protective housing.

Referring now to FIGS. 12 and 13, the installation of the protective housing 10 on a fishing pole 12 will be described. As shown in FIG. 13, with the protective housing in the open position, tackle such as hooks 130 may be placed within storage compartment 50 and cover 100 is pressed onto storage compartment 50 to secure the hooks 130 in place. Prior to the installation of protective housing 10 on the fishing pole 12, hook 132, which is attached to fishing line 18 is hooked onto eyelet 16a and any slack in the fishing line 18 is taken out by the reel (not shown) to secure the hook 132 to the eyelet 16a. Rod 14 is then placed on housing element 22 of protective housing 10 such that the rod 14 is disposed in semicircular cutouts 62a and 62b. The upper portion of fishing line 18, between hook 132 and eyelet 16b, is positioned within notch 66a, while the lower portion of the fishing line 18, below the eyelet 16a, is positioned within semicircular cutout 62b. Housing element 20 is then pivoted over the fishing pole 12 from hinge 24 until longitudinal wall 30 interfaces with longitudinal wall 40 and hook portion 82 of latch 80 is pushed onto catch portion 84 of latch 80, causing barb 82a of hook portion 82 to hook over ridge 84a of catch portion 84, thereby securing the protective housing in the closed position, as shown in FIG. 12.

In this way, hook 132 is completely covered and the potential for the hook 132 to become entangled with other fishing lines or snagged on clothing or upholstery has been eliminated. Furthermore, storage compartment 50 allows the user to store fishing tackle, coins or any other equipment within the protective housing without having to worry about the stored equipment becoming entangled with the hook 132 or the fishing line 18.

While there is shown and described herein certain specific structures embodying the invention, it will be manifest to those skilled in the art that various modifications and rearrangements of the parts may be made without departing from the spirit and scope of the underlying inventive concept. For example, while the protective housing is disclosed as being formed of a plastic material such as polypropelene, any suitable material which may be used to form the housing, such as carbon fiber, fiberglass or metal materials may be used to form the protective housing. Furthermore, any type of hinge may be used to connect the first and second housing elements and the protective housing may be formed of any dimensions deemed suitable. Accordingly, the inventive concept is not limited to the particular forms herein shown and described except insofar as indicated by the scope of the appended claims.

What is claimed is:

1. A protective housing for a fishing pole, the fishing pole including a rod having eyelets, fishing line threaded through the eyelets and a hook attached to the fishing line, the protective housing comprising:

first and second housing elements, each having a substantially planar surface, first and second opposing longitudinal walls and first and second opposing end walls extending from said substantially planar surface, said first longitudinal walls of said first and second housing elements being hingedly coupled together so as to form an interior chamber when the protective housing is in a closed position, wherein said second longitudinal wall and said first and second end wall of said first housing element are in mutual contact with said second longitudinal wall and said first and second end wall of said second housing element, respectively, said second longitudinal walls of each of said first and second housing elements having cooperating latch elements for securing said protective housing in said closed position;

said first and second end walls of each of said first and second housing elements having a semicircular cutout arranged so as to form a circular opening in each end of said protective housing when in the closed position;

wherein the protective housing is mountable on the fishing pole by placing the rod longitudinally across one of said first and second housing elements, within said cutouts in said end walls of the housing element, and pivoting said first and second housing elements together until said protective housing is in said closed position with the rod being disposed within said circular openings at each end of said protective housing;

said protective housing further comprising at least one storage compartment integrally formed with said first housing element, said storage compartment being constructed and arranged so as to be located within said interior chamber when said protective housing is in said closed position; and said storage compartment having a cover for enclosing said storage compartment.

2. The protective housing of claim 1, wherein said storage compartment comprises a first wall disposed substantially parallel to said second longitudinal wall of said first housing element and first and second opposing side walls which interconnect said first wall with said second longitudinal wall, said first wall, second longitudinal wall and first and second side walls defining an interior region of said storage compartment.

3. The protective housing of claim 2, wherein the cover being constructed and arranged to be friction fit onto the storage compartment.

4. The protective housing of claim 3, wherein said cover comprises a substantially planar element having dimensions substantially similar to dimensions of said storage compartment, said planar element including first and second ribs constructed and arranged on said planar element such that when said cover is mounted on said storage compartment, said first rib frictionally engages said first side wall of said storage compartment and said second rib frictionally engages said second side wall of said storage compartment.

5. The protective housing of claim 2, wherein the cover is hingedly attached to the first wall of said storage compartment.

6. The protective housing of claim 1, wherein said cover is attached to the first wall by a living hinge.

7. The protective housing of claim 1, wherein said protective housing is formed from a plastic material.

8. The protective housing of claim 1, further comprising a notch in each of said first and second end walls of said first and second housing elements, said notches being arranged in said end walls so as to form openings in said end walls when said protective housing is in said closed position, said openings being for receiving said fishing line.

9. The protective housing of claim 1, wherein said first longitudinal walls of said first and second housing elements are hingedly coupled together by a living hinge.

10. The protective housing of claim 1, further comprising a number of apertures in each of said substantially planar surfaces of said first and second housing elements.

11. The protective housing of claim 1, said protective housing being formed by injection-molding.

* * * * *